US007765224B2

(12) United States Patent
Li et al.

(10) Patent No.: US 7,765,224 B2
(45) Date of Patent: Jul. 27, 2010

(54) USING MULTI-DIMENSIONAL EXPRESSION (MDX) AND RELATIONAL METHODS FOR ALLOCATION

(75) Inventors: Baomin Li, Renton, WA (US); Peiyuan Yan, Redmond, WA (US); Xiaohong Yang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 344 days.

(21) Appl. No.: 11/283,313

(22) Filed: Nov. 18, 2005

(65) Prior Publication Data

US 2007/0118516 A1    May 24, 2007

(51) Int. Cl.
    *G06F 7/00* (2006.01)
(52) U.S. Cl. .................. 707/760; 602/769; 602/792
(58) Field of Classification Search .............. 707/2, 707/4, 5, 101, 602, 760, 769, 792
    See application file for complete search history.

(56) References Cited

U.S. PATENT DOCUMENTS

| | | | | |
|---|---|---|---|---|
| 5,317,686 A * | 5/1994 | Salas et al. | ................... | 715/503 |
| 5,381,524 A * | 1/1995 | Lewis et al. | ................... | 715/804 |
| 5,455,945 A * | 10/1995 | VanderDrift | ................... | 707/2 |
| 5,581,749 A * | 12/1996 | Hossain et al. | ................. | 707/10 |
| 5,765,159 A * | 6/1998 | Srinivasan | ................... | 707/102 |
| 5,819,293 A * | 10/1998 | Comer et al. | ................. | 707/203 |
| 5,842,180 A * | 11/1998 | Khanna et al. | ................. | 705/30 |
| 5,852,811 A | 12/1998 | Atkins | .......................... | 705/36 |
| 5,966,716 A * | 10/1999 | Comer et al. | ................. | 707/203 |
| 6,405,208 B1 | 6/2002 | Raghavan et al. | ........... | 707/102 |
| 6,671,670 B2 * | 12/2003 | Levin et al. | ................... | 704/270 |
| 6,725,422 B1 * | 4/2004 | Bauchot et al. | ............. | 715/503 |
| 2002/0067358 A1 | 6/2002 | Casari et al. | ................. | 345/440 |
| 2003/0212611 A1 * | 11/2003 | Barrott et al. | .................. | 705/27 |
| 2004/0139061 A1 | 7/2004 | Colossi et al. | ................... | 707/3 |
| 2004/0267700 A1 | 12/2004 | Dumais et al. | ................... | 707/2 |
| 2005/0004904 A1 | 1/2005 | Kearney et al. | ................. | 707/3 |
| 2005/0010565 A1 | 1/2005 | Cushing et al. | ................. | 707/3 |
| 2005/0015360 A1 | 1/2005 | Cras et al. | ...................... | 707/2 |
| 2005/0038768 A1 | 2/2005 | Morris | .......................... | 707/1 |
| 2005/0154662 A1 | 7/2005 | Langenwalter | ............... | 705/35 |

OTHER PUBLICATIONS

"Optimizing Cell Writeback in Microsoft SQL Server 2000 Analysis Services" (http://technet.microsoft.com/en-us/library/aa902668(SQL.80,printer).aspx), Dennis Kennedy, Microsoft Corporation, Feb. 2003.*
"*ProClarity™ Analytic Platform 4.0—Getting Started Guide*"; 1999; pp. 1-136.
"*Oracle9i OLAP, Developer's Guide to the OLAP DML*"; Release 2 (9.2); Mar. 2002; 342 pgs.

* cited by examiner

*Primary Examiner*—Etienne P LeRoux
*Assistant Examiner*—Bruce A Witzenburg
(74) *Attorney, Agent, or Firm*—Merchant & Gould

(57) ABSTRACT

Data allocation is performed by translating a rule set to a query list. An allocation engine receives the rule set and the data and generates a query list. The query list may be in MDX or SQL syntax. After modifying the queries in the list into a list of physical queries that match the specific characteristic of the data store, a modeling abstraction layer provides the physical queries to the data store engine to perform the queries and provide the results to the allocation engine. The allocation engine allocates the data among existing or new hierarchical levels based on the query results. The allocated data may be stored in the same data store as the original data.

19 Claims, 6 Drawing Sheets

USING MULTI-DIMENSIONAL EXPRESSION (MDX) AND RELATIONAL METHODS FOR ALLOCATION

BACKGROUND

In planning, budgeting and forecasting scenarios a common calculation is to set a high level goal and then break it down to lower level numbers that support the goal. These types of calculations are called allocations. Existing methods for allocation are typically ad hoc and the underlying calculations are usually performed by specialized calculation engines.

SUMMARY

Allocation expressions are described in a high-level abstract data model that includes a multi-dimensional data set, an allocation target, an allocation source, and an allocation ratio. This abstract data model is then described using a language similar to MDX (Multi-Dimensional Expression) language. An allocation thus described is stored in the system as a rule. Such a rule may be translated to MDX or SQL queries. An allocation engine may forward the queries to a data store engine for execution. The data store engine runs the query and returns the allocation result to the allocation engine. The allocation engine may write the result back to the data store via a write back manager.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Illustrative Operating Environment

Figure 1:
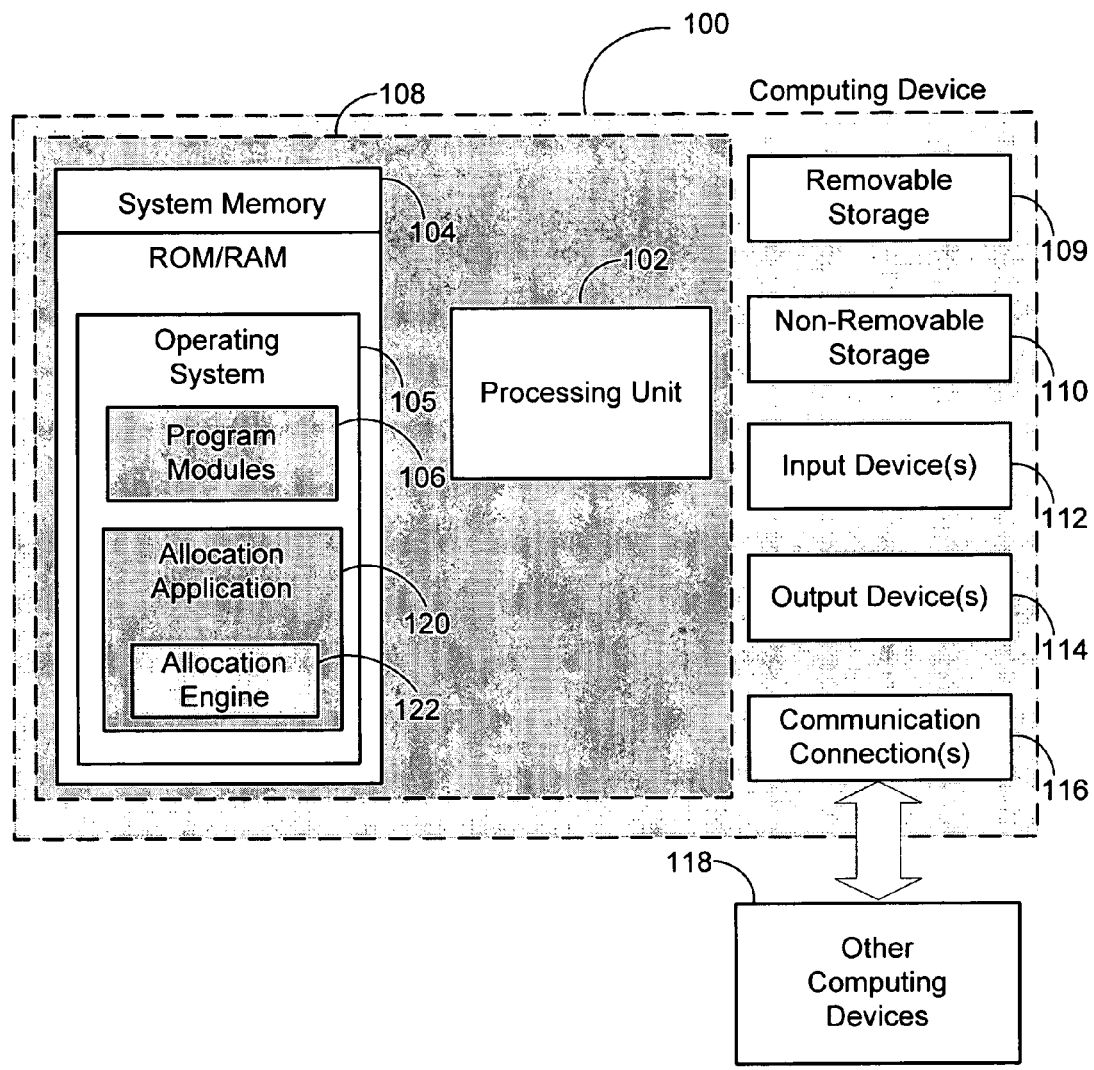
FIG. 1 illustrates a computing device in which an allocation application may be executed using multi-dimensional expression and relational methods.

Referring to FIG. 1, an exemplary system for implementing some embodiments includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes operating system 105 and one or more program modules 106 working within operating system 105.

In addition to program modules 106, allocation application 120 may also be executed within operating system 105. Allocation application 120 may be a business application performing calculations on multi-dimensional data to analyze and report on status, goals, progress, financial analysis, and the like. Allocation application 120 may include allocation engine 122 configured to translate a user-defined rule set into a multi-dimensional expression or relational method to allocate data within a data space.

To perform the actions described above, allocation application 120 may include and/or interact with other computing devices and applications and application interfaces (APIs) residing in other applications such as databases engines, and the like.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data.

System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as retail devices, keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Figure 2:
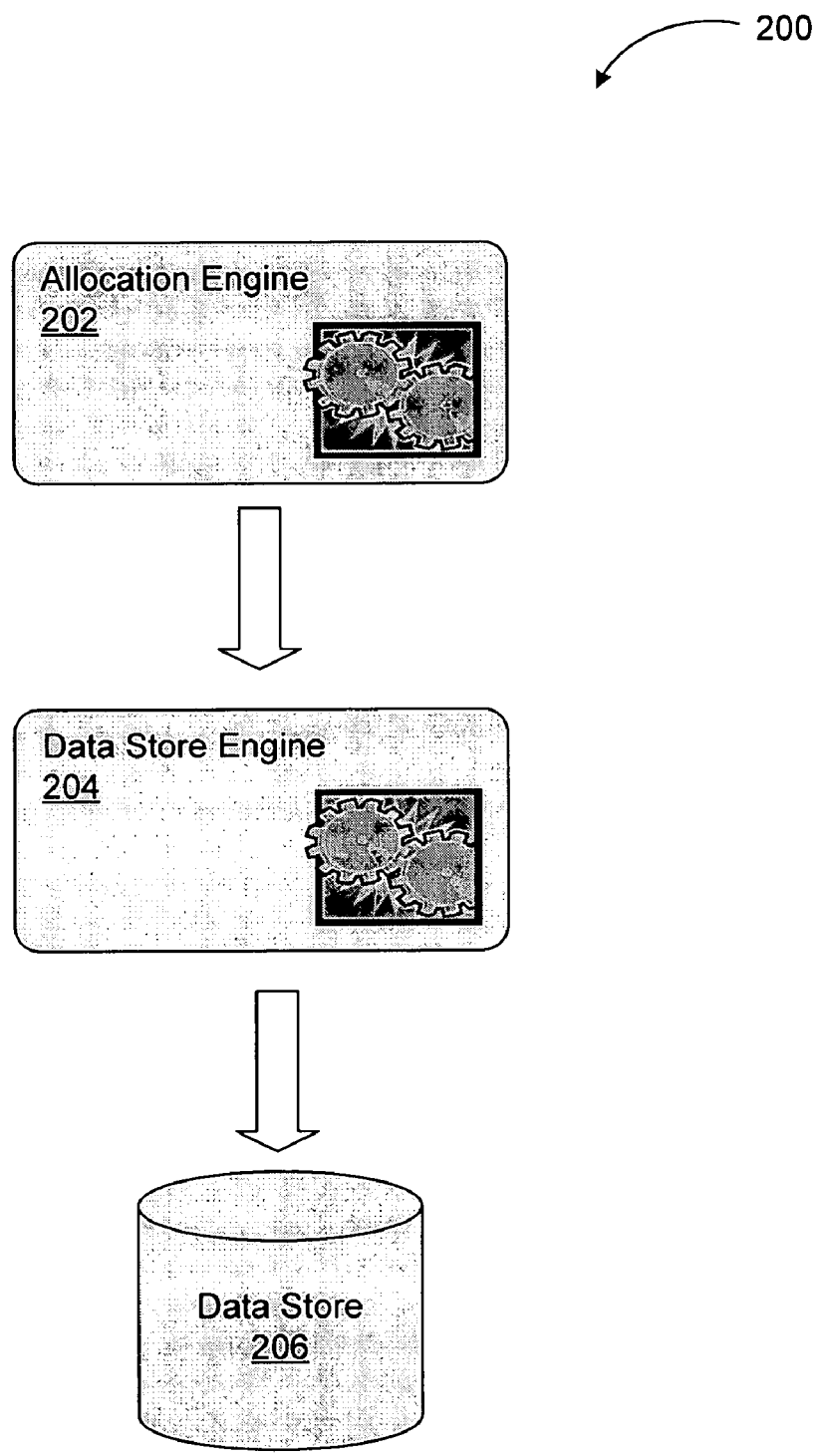
FIG. 2 illustrates a diagram of major components in performing allocation using multi-dimensional expression methods.

FIG. 2 illustrates a diagram of major components in performing allocation using multi-dimensional expression methods. Diagram 200 includes allocation engine 202, data store engine 204, and data store 206.

Allocation engine 202 may be part of an allocation application such as allocation application 120 of FIG. 1. In one embodiment, the allocation application may be run across distributed servers, mainframe computers, and the like. The server(s) may include a number of other applications such as accounting applications, database applications, communication applications, and the like.

In another embodiment, the server(s) may interact with a database such as data store 206 that is arranged to store data for business applications. The allocation application may allocate data by having allocation engine 202 translate user defined or selected rules to a query list. To perform the actions for the allocation operation, allocation engine 202 may interact with data store engine 204, as well as other modules such as a Modeling Abstraction Layer (MAL), a user interface, and the like.

After translating the rules to a query list that conforms to MDX or SQL syntax, allocation engine may submit the query list to data store engine 204. Data store engine 204 may submit the query to data store 206 and provide the results back to allocation engine 202. In some embodiments, allocation engine 202 may write the allocated data in form of a subspace to the data space within data store 206.

The allocation application may interact with client devices, such as a handheld computer, a desktop computer, and a laptop computer, over a network to receive the data or the rule set, provide reports, and perform other allocation related tasks. Client devices communicating with the server(s) may include any type of computing device, not limited to the examples listed herein.

The network may be a secure network such an enterprise network, or an unsecure network such as a wireless open network. The network provides communication between the nodes described above. By way of example, and not limitation, the network may include wired media such as a wired network or direct-wired connection, and wireless media such as acoustic, RF, infrared and other wireless media.

Many other configurations of computing devices, communications, applications, and distribution systems may be employed to implement a business application that translates user defined or selected rules to a query list for allocation.

Illustrative Embodiments for Using MDX and Relational Methods for Allocation

Embodiments of the present invention are directed to converting user defined rules in MDX-like high level language to MDX or SQL queries such that data can be allocated. An end user may be presented with five major concepts: rule, rule set, target scope specification, and ratio specification. A rule set is essentially an ordered collection of rules. The rule may be determined by three items: target scope specification, source specification, and ratio specification.

Once the user defines the rule, the rule set, and attaches them to a model, the allocation engine can translate them into query statements. The query statements may be in MDX or SQL syntax. The query statements are then handed to a data store engine such as MS SQL Server Analysis Service® to be executed. SQL queries may be passed to any relational database engine.

The MDX queries generated from the rules are in the form of a query rather than calculation scripts. The difference between a query and a calculation script is that the former is run only when the user explicitly invokes it and the result does not change the cube unless the user explicitly writes the result back, and the latter is built into the cube and is run every time a user issues a query affecting one of the cells within the scope of the calculation script. A script may cause significant performance degradation to the cube because it is invoked over and over again.

When the allocation engine is going to execute an allocation rule, it first translates the rule to a query and passes the query to the data store engine for execution. The data store engine runs the query and returns the allocation result to the allocation engine. The allocation engine then writes the result back to the cube via a write back manager.

Figure 3:
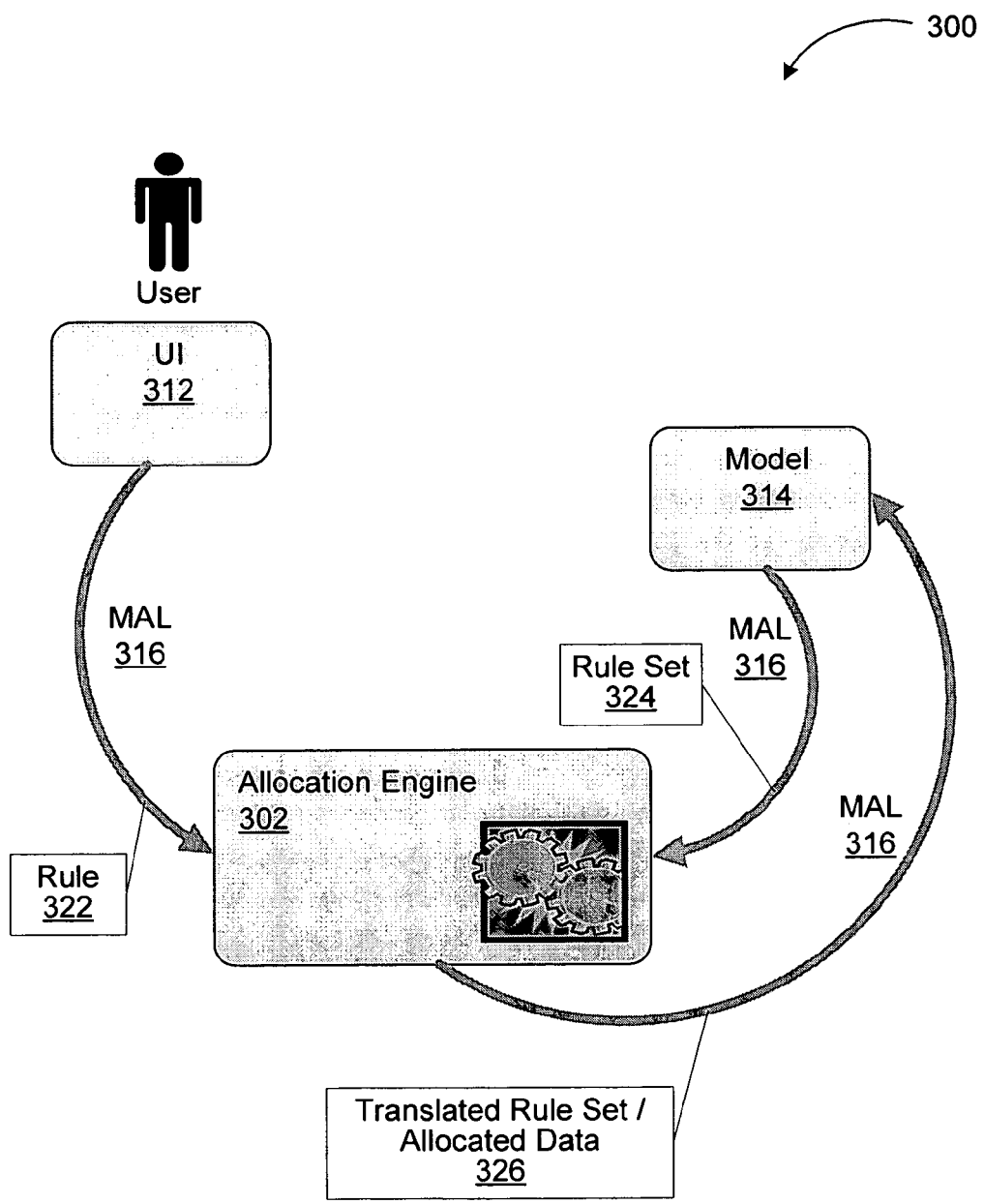
FIG. 3 is a conceptual diagram illustrating exchanges between a user, an allocation engine, and a model during allocation.

FIG. 3 is a conceptual diagram illustrating exchanges between a user, an allocation engine, and a model during allocation. As diagram 300 shows, allocation engine 302 may receive a rule or a rule set to be translated to a query list from user interface 312 or from model 314 through MAL 316.

For example, a human resources budget may be set at $1,000,000 for a whole organization. The budget may need to be then broken down to each department based on the current head counts in each department. The user may specify the problem in MDX-like syntax as:

```
{(source = $1,000,000, target = ([Account Dimension].[Account
Hierarchy].[Budget],
Descendants([Organization Dimension].[ Organization Hierarchy].[Root],
10, leaves)),
ratio = ([Account Dimension].[Account Hierarchy].[Headcount],
Descendants([Organization Dimension].[ Organization Hierarchy].[Root],
10, leaves))}.
```

In the above rule the "source" is an MDX expression which results in a value. Examples of source include a constant value, a constant cell that is independent of a target cell, or an ancestor of the current target cell along some dimensions (the same dimensions in which descendant construct is used when defining the target). The "target" is a sub cube. The sub cube may be of a form where each dimension is a single member, every member, or the descendants of a single member. The "ratio" is another MDX expression that results in a number. The "ratio" may be based on equal distribution, weighted averaging of cells, or another user defined distribution scheme.

The rule is then translated to either relational (SQL stored procedure) or MDX cell calculation query, and the calculation is performed accordingly by the underlying platform. The result of the calculation may be written back to the data repository in a sub cube form.

In the above example, allocation engine 302 receives the rule in MDX-like syntax as rule 322 from user interface 312 through MAL (Modeling Abstraction Layer—an internal software component of the allocation framework) 316. In another embodiment, the rule may be received as part of rule set 324 from model 314 through MAL 316. When allocation engine 302 is done with translating the rule into the relational (SQL stored procedure) or MDX cell calculation query, it may provide the query to a data store through MAL 316. In another embodiment, the query may also be provided to model 314 through MAL 316.

Figure 4:
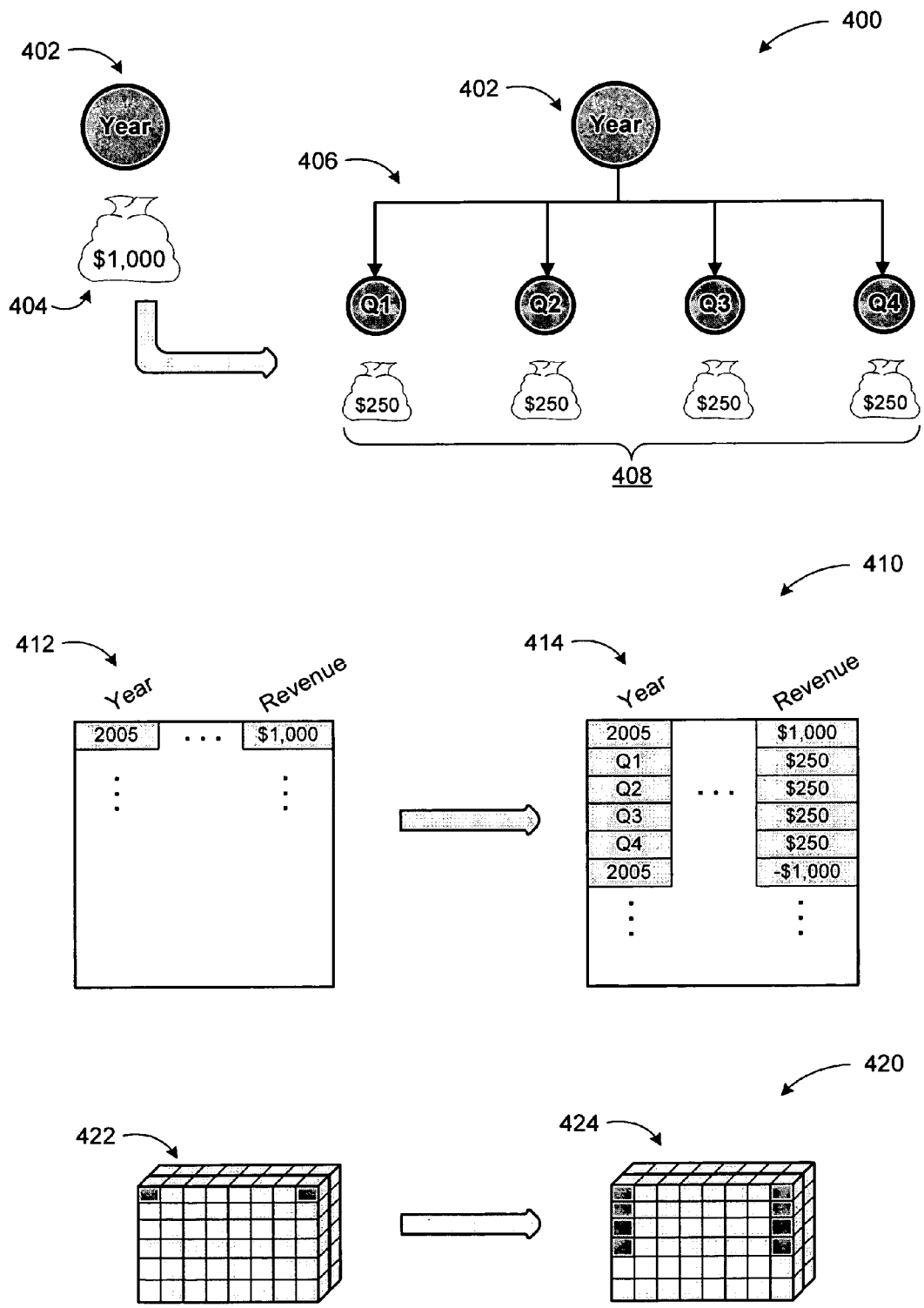
FIG. 4 includes three conceptual diagrams illustrating an example allocation and its representation in different data structures.

FIG. 4 includes three conceptual diagrams illustrating an example allocation and its representation in different data structures.

As mentioned above, data may be structured in many different ways in a multi-dimensional system. Furthermore, different hierarchies may be implemented within each structure. Diagram 400 shows a typical financial allocation operation. A revenue (404) amount of $1,000 may be assigned to year 402 without further breakdown. Following an allocation operation, year 402 may be broken down to quarters 404 (Q1, Q2, Q3, and Q4). As a result of the allocation, each of the quarters may be assigned individual revenues (408) of $250. In this example, the allocation of the revenue data is based on equal distribution. Other distribution schemes such as weighted average, user defined formula, and the like may also be specified for allocating the data.

Diagram 410 illustrates two example data tables used to store data based on the example of diagram 400. Table 412 includes data prior to the allocation. One of the dimensions is year; another is revenue. After the allocation, a sub-space including quarters Q1-Q4 are added to table 414 under year 2005. Because revenue data is now duplicated in the quarters and the top year row, another year row with negative revenue amount is added to ensure total revenue for the year is still the same.

Diagram 420 illustrates the same example with the data saved in multi-dimensional data cubes 422 and 424 before and after the allocation, respectively. Detail values are the same as in tables 412 and 414, and therefore not shown.

Figure 5:
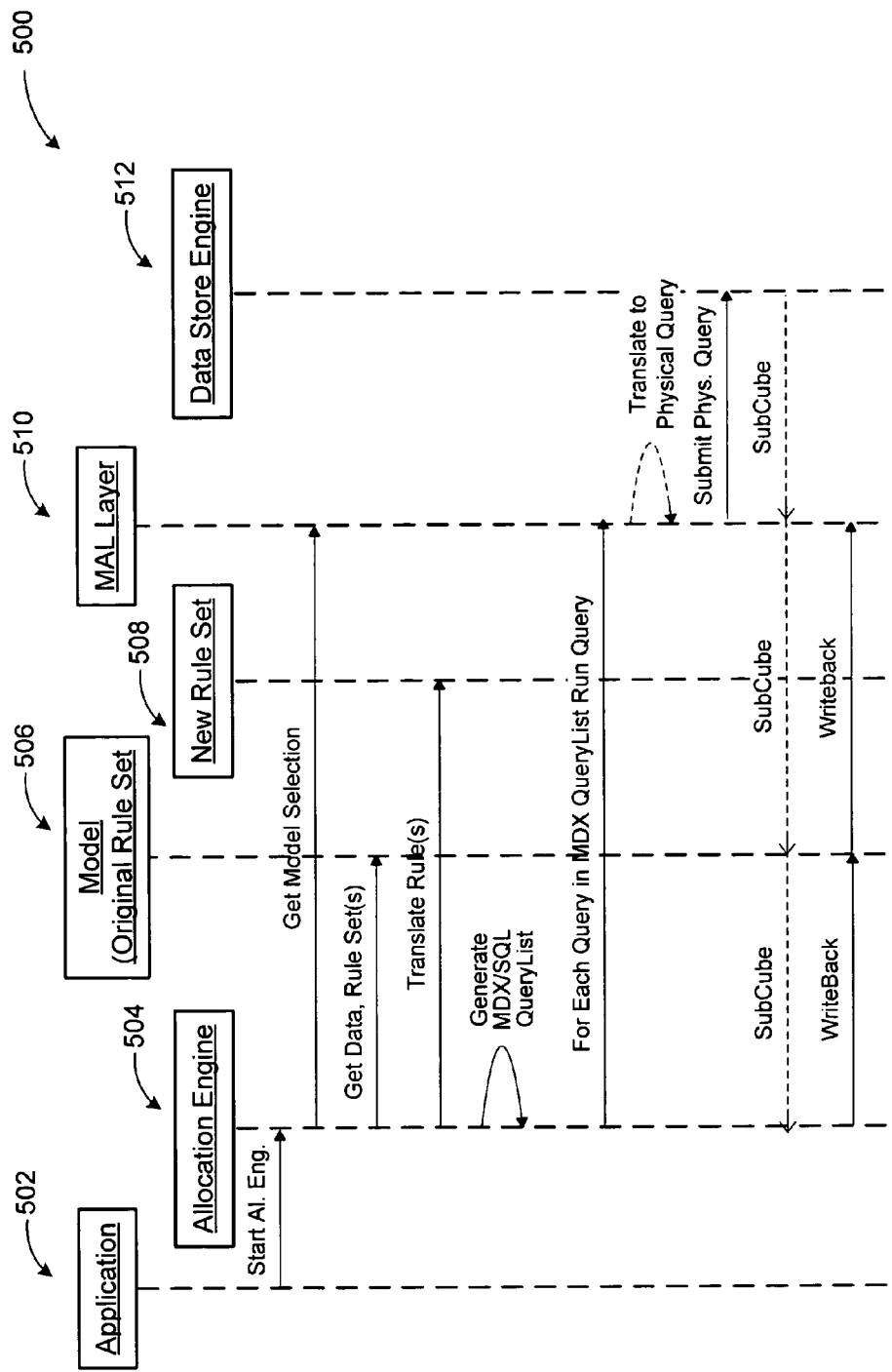
FIG. 5 is a diagram illustrating actions between major components for an example allocation using MDX queries.

FIG. 5 is a diagram illustrating actions between major components for an example allocation using MDX queries. Major components shown in diagram 500 include Application, Allocation Engine, Model (including original rule set and data), New Rule Set, Modeling Abstraction Layer (MAL), and Data Store Engine.

An allocation operation begins with application 502 starting allocation engine 504 upon receiving a request for the allocation. Starting allocation engine 504 may include loading and executing an instance of the allocation engine.

Allocation engine 504 then receives a model selection from Modeling Abstraction Layer (MAL) 510. MAL 510 may provide the model selection from a user interface, where a user makes the selection.

Allocation engine 504 receives the data and the original rule set from model 506 based on the model selection. In some embodiments, the original rule set may include a single rule provided by the user. In other embodiments, the original rule set may be a complicated set of rules selected from a rule set database as described below in conjunction with FIG. 6.

Next, allocation engine 504 translates the original rule set to new rule set 508 using MDX syntax. This operation involves generating an MDX query list. The allocation engine may then run a query for each query in the MDX query list, which is provided to MAL 510. In one embodiment, MAL 510 may translate the queries to physical queries, which are modified version of the MDX queries to match the particular data store where the data resides.

MAL 510 submits the physical query to data store engine 512, which performs the query and provides the results in form of a sub cube. The sub cube is provided to allocation engine 504. Allocation engine 504 may, in some embodiments, write the sub cube back to the MAL layer for further storage in the data store.

Other data structures, operational modules, hierarchies, operations, naming conventions, and the like may be implemented using the principles described herein.

Figure 6:
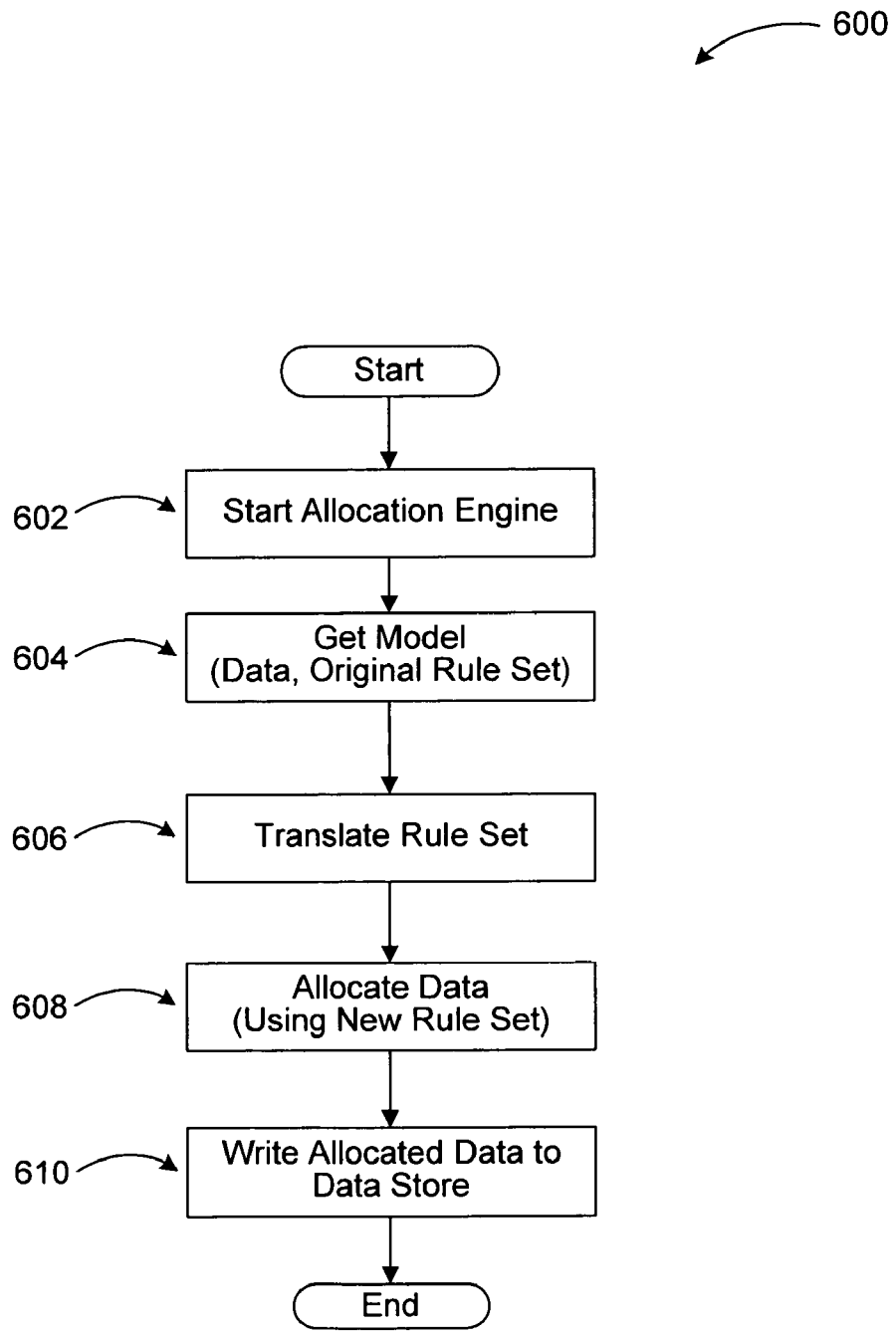
FIG. 6 illustrates a logic flow diagram for a process of performing allocation using multi-dimensional expression methods.

FIG. 6 illustrates a logic flow diagram for process 600 of performing allocation using multi-dimensional expression methods.

Process 600 begins at operation 602, where an allocation engine is started upon receiving a request for allocating data. As described previously, the allocation engine performs a number of actions including translation of a rule set to a query list for efficient allocation of data within a data space. Processing moves from operation 602 to operation 604.

At operation 604, the allocation engine receives a model. The model may include the data as well as an original rule set. The original rule set may be provided to the model from a user interface as defined by a user or a business modeler application. The user interface may be configured to provide the request for allocating the data and the original rule set associated with allocating the data based on user input. The original rule set may include a plurality of rules such that at least one rule of the plurality of rules is dependent from another rule of the plurality of rules. Processing advances from operation 604 to operation 606.

At operation 606, the allocation engine translates the original rule set to a new rule set. The new rule set may include a rule that is a Multi-Dimensional eXpression (MDX) query statement or a Sequential Query Language (SQL) query statement. Thus, the new rule set may be a query list. In another embodiment, the new rule set may be further modified to match a characteristic of the data space. The characteristic of the data space may be a dimension identifier, a hierarchical structure identifier, and the like. The modified rule set (query list) may also be called a physical query list. Processing moves from operation 606 to operation 608.

At operation 608, the data is allocated using the new rule set (query list) such that a new sub-space is generated for the allocated data in the data space. In one embodiment, the data is allocated by generating a new hierarchy level for the data that reports to an existing hierarchy level. The data may be distributed from the existing hierarchy level to the new hierarchy level according to one of: an equal distribution scheme, a weighted distribution scheme, and a user-defined formula. In another embodiment, the data may be distributed from at least one leaf of an existing hierarchy level to at least two leaves of another existing hierarchy level. The data space containing the hierarchy levels may be multi-dimensional, and the sub-space for the allocated data may be generated by creating an outline of dimensions and their members in a desired order.

Processing moves from operation 608 to operation 610, where the allocated data is written to a data store. Processing moves after completion of the allocation to a calling process for further actions.

The operations included in process 600 are for illustration purposes. Performing allocation using multi-dimensional expression methods may be implemented by a similar process with fewer or additional steps, as well as in different order of operations.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for allocating values in hierarchically structured data in a business application, the method comprising:
receiving a request for allocating data stored in a data space;
receiving a model associated with the data, wherein receiving the model associated with the data includes receiving a first rule set associated with allocation of the data, the first rule set comprising an allocation target, an allocation source, and an allocation ratio;
translating the first rule set to a second rule set, wherein translating the first rule set to the second rules set comprises translating the first rule set to a list of high-level language queries, the second rule set being configured to be modified to match a physical characteristic of the data space, the physical characteristic of the data space comprising at least one of the following: a dimension identifier and a hierarchical structure identifier;
executing the queries based on the second rule set; and
allocating the data based on executed query results, wherein allocating the data comprises at least one of the following: generating a sub-space in the data space and generating a hierarchy, wherein generating the sub-space comprises creating an outline of dimensions and members and wherein generating the hierarchy comprises:
generating a new hierarchy level for the data that reports to an existing hierarchy level, and
distributing the data in the existing hierarchy level to the new hierarchy level according to a weighted distribution scheme.

2. The computer-implemented method of claim 1, wherein allocating the data further comprises distributing the data in the existing hierarchy level to the new hierarchy level according to one of the following: an equal distribution scheme and a user defined formula.

3. The computer-implemented method of claim 1, wherein receiving the first rule set is comprises receiving the first rule set from one of the following: a user interface and a business modeler application.

4. The computer-implemented method of claim 1, wherein translating the first rule set further comprises translating the first rule set to one of the following: a Multi-Dimensional eXpression (MDX) query statement and a Structured Query Language (SQL) query statement.

5. The computer-implemented method of claim 1, further comprising specifying the allocation request in an MDX-like high level language and storing the allocation request as at least one rule.

6. The computer-implemented method of claim 1, further comprising storing the allocated data by generating sub spaces within the data space for the allocated data.

7. The computer-implemented method of claim 6, wherein storing the allocated data further comprises storing the data to a data store by a write-back manager.

8. The computer-implemented method of claim 1, wherein allocating the data comprises allocating multi-dimensional data and wherein generating the sub-space for the allocated data comprises generating a sub-cube.

9. A computer-readable medium having computer instructions which when executed perform a method for allocating hierarchically structured data, the method executed by the instructions comprising:
receiving a request for allocating data stored in a data space;
receiving a first rule set associated with the allocation of the data via a Modeling Abstraction Layer (MAL), wherein receiving the first rule set associated with the allocation of the data comprises receiving the first rule set comprising an allocation target, an allocation source, and an allocation ratio;
retrieving the data;
translating the first rule set to a second rule set, wherein translating the first rule set to the second rule set comprises translating the first rule set to a query list comprising high-level language queries, the second rule set being configured to be modified to match a characteristic of the data space, the characteristic of the data space being at least one of the following: a dimension identifier and a hierarchical structure identifier;
executing the query list on the data space; and
allocating the data based on results of the query list execution by distributing the data in an existing hierarchy level to a new hierarchy level that reports to the existing hierarchy level according to at least one of the following: a weighted distribution scheme and a user-defined formula, wherein allocating the data comprises at least one of the following: generating a sub-space in the data space and generating the new hierarchy, wherein generating the sub-space comprises creating an outline of dimensions and members.

10. The computer-readable medium of claim 9, wherein executing the query list comprises executing at least one query conforming to one of the following: a Multi-Dimensional eXpression (MDX) and a Structured Query Language (SQL).

11. The computer-readable medium of claim 9, wherein allocating the data comprises allocating the data for at least one of the following: planning, budgeting, and forecasting a scenario in a business application.

12. The computer-readable medium of claim 9, wherein allocating the data space comprises allocating the data in a multi-dimensional data space.

13. The computer-readable medium of claim 12, further comprising distributing the data from at least one leaf of an existing hierarchy level to at least two leaves of another existing hierarchy level.

14. A system for allocating hierarchically structured multi-dimensional data in a business application, the system comprising:
a database configured to store data;
an allocation engine configured to:
receive a request for allocating the data;
receive at least one first rule associated with allocation of the data, the at least one first rule being associated with an allocation target, an allocation source, and an allocation ratio;
translate the at least one first rule to at least one second rule, wherein the at least one second rule comprises a query list comprising high-level language queries, each query in the query list being associated with a sub space of the database, the at least one second rule being configured to be modified to match at least one characteristic of the database, wherein the at least one characteristic of the database comprises at least one of the following: a dimension identifier and a hierarchical structure identifier;
a modeling abstraction layer configured to:
receive the query list;
translate the query list to a physical query such that the physical query conforms to the at least one characteristic of the database; and a database engine configured to:
  receive the physical query;
  execute the physical query on the database;
  provide results of the physical query execution for allocating the data by the allocation engine to one of: an existing hierarchical structure and a new hierarchical structure in the database, the data being allocated to at least one of the following: a sub-space in the data space and the new hierarchy, wherein allocating the data comprises allocating the data according to at least one of the following: a weighted distribution scheme, and a user-defined formula, and the database engine being configured create an outline of dimensions and members.

15. The system of claim 14, further comprising a user interface configured to provide the request for allocating the data and the rule set associated with allocating the data based on user input.

16. The system of claim 14, wherein the allocation engine is further configured to allocate the data from at least one leaf of the existing hierarchy level to at least two leaves of another existing hierarchy level.

17. The computer-implemented method of claim 1, wherein receiving the model comprises receiving the model including the data.

18. The system of claim 14, wherein the model includes the data and the at least one first rule associated with the allocation of the data.

19. The computer-implemented method of claim 1, further comprising determining the first rule set with at least the following: a target scope specification, a source specification, and the ratio specification.

* * * * *